United States Patent [19]

Halbert

[11] Patent Number: 5,777,860
[45] Date of Patent: Jul. 7, 1998

[54] ULTRASONIC FREQUENCY POWER SUPPLY

[75] Inventor: Robert C. Halbert, Bethel, Conn.

[73] Assignee: Branson Ultrasonics Corporation, Danbury, Conn.

[21] Appl. No.: 733,117

[22] Filed: Oct. 16, 1996

[51] Int. Cl.[6] .............. H01L 41/08; H02M 5/40
[52] U.S. Cl. .............. 363/34; 310/316; 310/317
[58] Field of Search .............. 363/34, 37, 98; 307/64, 85, 66; 310/316, 317; 219/10.49

[56] References Cited

U.S. PATENT DOCUMENTS

| | | | |
|---|---|---|---|
| 4,736,130 | 4/1988 | Puskas | 310/316 |
| 4,743,789 | 5/1988 | Puskas | 310/316 |
| 5,276,376 | 1/1994 | Puskas | 310/317 |
| 5,496,411 | 3/1996 | Candy | 310/317 |

*Primary Examiner*—Peter S. Wong
*Assistant Examiner*—Rajnikant B. Patel
*Attorney, Agent, or Firm*—Polster, Lieder, Woodruff & Lucchesi

[57] ABSTRACT

An ultrasonic power supply for driving piezoelectric transducers in an ultrasonic cleaning apparatus comprises a full-wave rectifier for providing unfiltered direct current to an inverter circuit of the clamped mode resonant converter type, which provides alternating current output at the series resonant frequency condition of the transducers. The inverter circuit switching cycle is controlled responsive to means for causing a set average power level to be maintained, means for causing the resonant frequency to be maintained and including means for causing the resonant frequency to be swept symmetrically by an adjustable sweep frequency. Also, power modulation means are provided for optionally providing to the transducers power bursts of a set amplitude, but at the set average power level. As a result of the unfiltered direct current from the full-wave rectifier, the power supply will operate substantially at unity power factor.

9 Claims, 6 Drawing Sheets

IMPEDANCE MATCHING CIRCUIT

POWER MEASUREMENT CIRCUIT

PHASE DETECTION CIRCUIT

FREQUENCY CONTROL CIRCUIT

ULTRASONIC FREQUENCY POWER SUPPLY

BACKGROUND OF THE INVENTION

The process of ultrasonic cleaning entails an ultrasonic power supply capable of vibrating an array of transducers. The transducers convert the electrical energy supplied by the power supply into high frequency mechanical waves which cause pressure fluctuations above and below the pressure of the liquid in which the waves are propagated. The pressure fluctuations create microscopic cavitation bubbles within the liquid which slowly expand and then rapidly collapse. The rapid collapse of the bubbles creates instantaneous pressures which radiate away from the bubbles, thereby removing particulate contamination on the surface of a workpiece at the point of implosion.

Ultrasound waves typically are created in the range from 16 kHz to 100 kHz and most commonly at a frequency of 20, 25 or 40 kHz. Lower frequency ultrasonic waves create higher cavitation intensities on account of the inverse relationship between frequency and the radius of a bubble prior to its collapsing. The combination of the liquid (type, temperature, and level) and the transducers constitute the load for the power supply.

BRIEF SUMMARY OF THE INVENTION

The present invention discloses an ultrasonic frequency power supply for driving an array of piezoelectric transducers. The power supply uses an asymmetrical full-bridge inverter circuit to produce a pulse width modulated voltage which is filtered in an output matching circuit and applies a variable amplitude alternating current voltage to the transducer array operating at its resonant condition, for instance its series resonance. An average power setting and feedback control is provided to maintain the average power supplied from the power supply to the array of transducers. An automatic frequency tracking circuit also is provided to force the power supply to generate the ultrasonic frequency at the resonant condition of the transducers and load. Further, a frequency modulation function generator sweeps the operating frequency of the power supply symmetrically through the resonant frequency at a set width and rate. Also, a power modulation function generator varies the output power to the transducers at a set peak to average power ratio.

The following description will provide an overview of the novel features indicated above.

Prior art ultrasonic cleaning power supplies, for the most part, use a driving voltage derived from a direct current voltage source, known as continuous wave (CW), or a full or half-wave rectified line voltage, known as amplitude modulation (AM). Improvements are shown, for instance, in U.S. Pat. No. 4,736,130 issued to Wm. L. Puskas, by using a cavitation density function generator and voltage regulator to adjust the driving voltage to the ultrasonic generator, thus varying the amplitude and power into the transducers. The problems with this scheme reside in the necessity for two power supplies, one to provide the variable direct current voltage and the other to produce the ultrasonic frequencies necessary for the transducers. The use of two power supplies increases cost, complexity, and contributes to power inefficiencies. Also, a variable direct current power supply has a low power factor, which pulls high currents, causes supply line disturbances, and is coming under regulatory compliance requirements to increase the power factor. The power supply disclosed herein overcomes these limitations by operating directly from a full-wave rectified alternating current voltage source and using a full-bridge asymmetrical pulse width modulated inverter. This arrangement gives the power supply the ability to create the ultrasonic frequencies necessary, while controlling the output voltage amplitude by varying the duty cycle of the electronic switches of the inverter. Thus, the inverter replaces two power supplies and because it operates off the rectified and non-filtered alternating current line voltage, the power factor will be near unity.

It is known in the ultrasonic cleaning art that high peak or power bursts are necessary for aggressive cleaning or for cavitating liquids, such as hydrocarbons. The prior art, such as the patent supra, provides a power burst control for adjusting a duty cycle of the power supply's electronic switches, but without power regulation control. This will cause high peak power to be delivered to the load, but the average power to decrease. To increase the average power, the user would have to adjust the output voltage of the variable direct current supply feeding the ultrasonic power supply. The power supply disclosed hereafter overcomes this problem by enabling the user to set an average power value and a power modulator peak to average power parameter. This is accomplished by having an outside control loop controlling the average power and within this loop having a function generator producing a waveform with a peak power proportional to the average power. The proportionality constant of the waveform is selected by the user. The effect of this arrangement is an output power pulse or wave of variable amplitude but at a constant average power. If the frequency of this power wave is greater than 2 kHz, the power supply will remain near unity power factor.

One of the principal objects of this invention is the provision of a new and improved ultrasonic power supply for an ultrasonic cleaning apparatus.

Another important object of this invention is the provision of an ultrasonic power supply for driving one or more transducers forming a part of an ultrasonic cleaning apparatus at resonant frequency and including control means for maintaining the resonant frequency condition.

Another important object of this invention is the provision of a power supply for an ultrasonic cleaning apparatus, the power supply operating substantially at unity power factor.

A further important object of this invention is the provision of a power supply for an ultrasonic cleaning apparatus, the power supply including means for maintaining constant average power flow to the transducers which convert the electrical power applied to mechanical vibrations propagated in a liquid.

A still further object of this invention is the provision of an ultrasonic power supply including means for creating power bursts, yet maintaining a set average power level.

Another and further object of this invention is the provision of a power supply for an ultrasonic cleaning apparatus including means to modulate the resonant ultrasonic frequency at a set frequency width and rate.

Further and still other objects of this invention will become more clearly apparent from the following description when read in conjunction with the accompanying drawings.

DETAILED DESCRIPTION OF THE INVENTION

Figure 1:
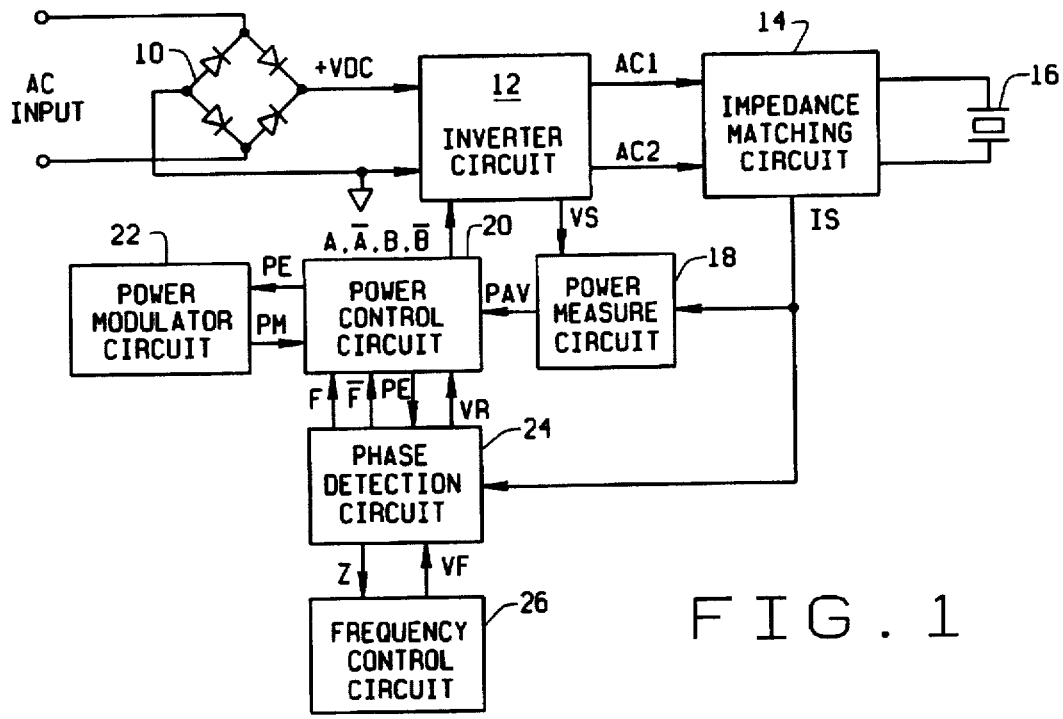
FIG. 1 is a schematic block diagram of the ultrasonic frequency power supply disclosed herein.

FIG. 1 shows the main components of the ultrasonic power supply. An a.c. voltage input is supplied to a full-wave rectifier 10 for providing an unfiltered d.c. voltage to an inverter circuit 12. No filter capacitor is used, thereby causing the d.c. voltage undulations to have the same phase and amplitude as the a.c. line voltage. The inverter circuit 12 converts the d.c. voltage into high frequency a.c. voltage of variable duty cycle, which voltage is applied by conductors AC1 and AC2 to an impedance matching circuit 14. The impedance matching circuit filters out harmonics higher than the fundamental frequency, hence leaving only a sinus-oidal voltage with an amplitude proportional to the duty cycle of the inverter circuit 12. The output from the impedance matching circuit 14 is used to drive piezoelectric transducer means 16, comprising one or more transducers, for producing ultrasonic waves in a liquid into which a workpiece to be cleaned is immersed. A power measuring circuit 18 calculates the average electrical power PAV delivered to the transducer means 16 by receiving at its input a signal IS commensurate with the current flowing through the impedance matching circuit 14 and a signal VS commensurate with the d.c. voltage from the rectifier 10 to the inverter circuit 12. The output signal PAV representing average power is fed to a power control circuit 20. The power control circuit 20 controls the switching times of the four semiconductor switches of the inverter circuit 12 by means of conductors A, $\overline{A}$, B and $\overline{B}$.

The power modulator circuit 22 receives from the power control circuit 20 a signal PE corresponding to an average power adjustment signal and has adjustable control means for enabling the user to program a set peak to average ratio of the power delivered to the transducer means 16 by a signal PM supplied to the power control means 20. The phase detection circuit 24 calculates the phase shift error between the driving frequency from the power supply and the resonant frequency of the transducer means by receiving a signal IS commensurate with the current flowing to the impedance circuit 14 and the signal PE corresponding to the average power adjustment signal. The phase detection circuit provides output signals F and $\overline{F}$, which after being processed in the power control circuit 20, result in signals A, $\overline{A}$ and B, $\overline{B}$ for controlling the timed operation of the semiconductor switches of the inverter circuit 12. The phase detection circuit 24 also supplies a signal Z, indicative of the phase difference between the driving frequency and the resonant frequency, to a frequency control circuit 26. This latter circuit converts the phase error into an appropriate driving frequency signal to minimize the frequency error and provides an output signal VF, a voltage representing twice the operating frequency of the inverter, to the phase detection circuit 24. The frequency control circuit 26 also includes control means for setting the frequency modulation width and rate.

Figure 2:
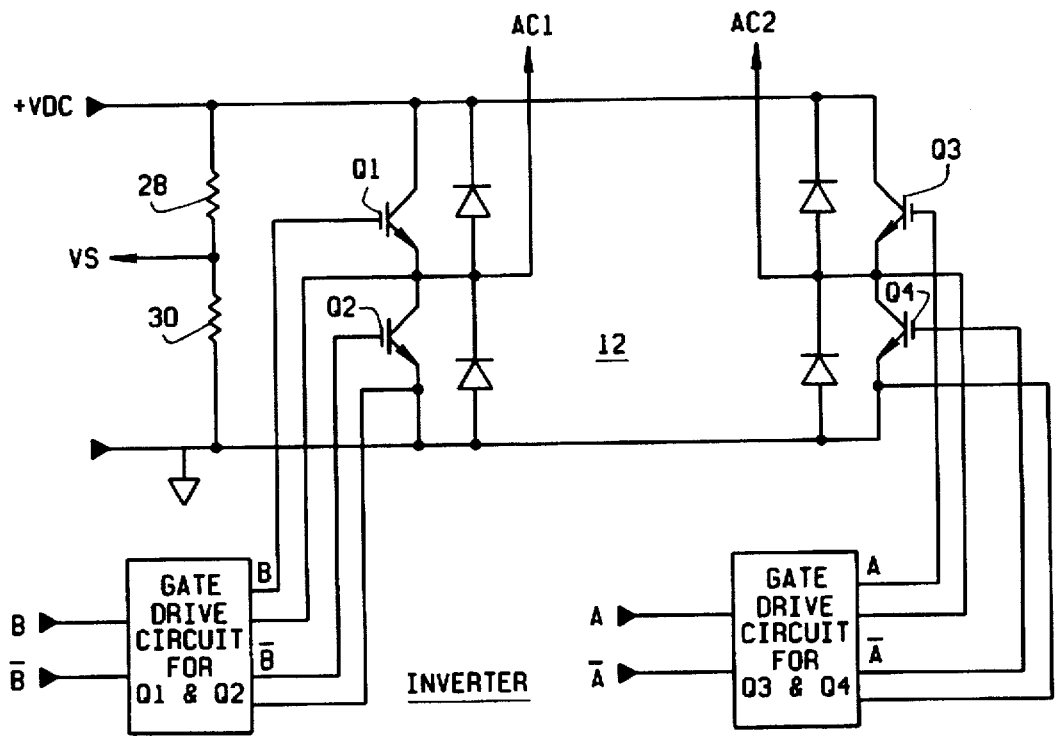
FIG. 2 is a schematic electrical circuit diagram of the inverter.
Figure 3:
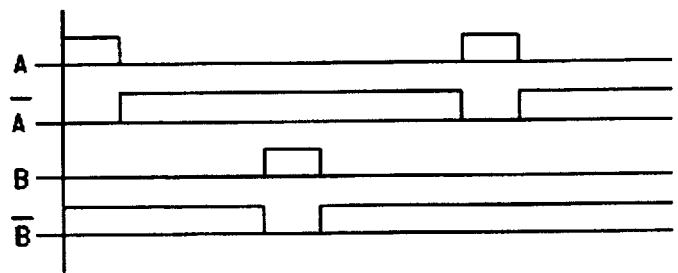
FIG. 3 is an illustration of waveforms pertaining to FIG. 2.

FIG. 2 shows the circuit diagram of the inverter circuit, the waveforms pertaining to the signals are shown in FIG. 3. The inverter is a full-bridge topology, using an asymmetrical pulse width modulation for converting the input direct current voltage to alternating current quasi-square waves. The inverter is known also as "Clamped Mode Resonant Converter".

The electronic switches and diode combinations in the inverter are bi-directional and are near zero resistance when conductive and near infinity resistance when non-conductive, with the capability of blocking the full direct current bus voltage. The switches, in the present example, are IGBT type (insulated-gate bipolar transistor) with anti-parallel diodes connected across the switches. The upper switches Q1 and Q3 are alternately pulse width modulated with respect to each other to transfer power from the d.c. voltage supply 10 to the load. In a positive voltage cycle the semiconductor switch Q1 and its diagonal Q4 are conductive. Likewise, during a negative voltage cycle, switch Q3 and its diagonal Q2 are conductive. The duty cycle is variable between zero and fifty per cent. The bottom switches Q2 and Q4 are used for power transfer and resonant current conduction before and after power transfer. The bottom switches are the logic inverse of the top switches, causing the load to be clamped (zero voltage) when no power is transferred. This switching circuit causes an output alternating voltage source with zero source impedance, and provides the ability to conduct current regardless of the impedance of the load. A voltage divider using resistors 28 and 30 across the incoming direct current voltage produces a voltage signal VS which is proportional to the d.c. voltage.

Figure 4:
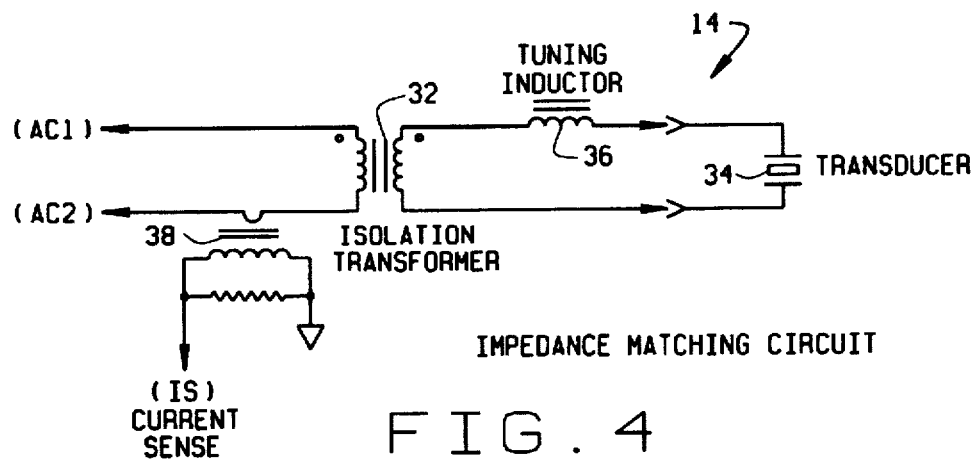
FIG. 4 is a schematic electrical circuit diagram of the impedance matching circuit.

The impedance matching circuit 14 is shown in FIG. 4. The purpose of this circuit is to electrically isolate the line from the load using an isolation transformer 32, and to set the electro-strictive capacitance of the transducer means 34 and series inductor 36 to resonance at the operating frequency, which typically is the series resonant frequency of the transducers. A current sense signal IS is derived from a current transformer 38 connected in the primary side of the transformer 32.

Figure 5:
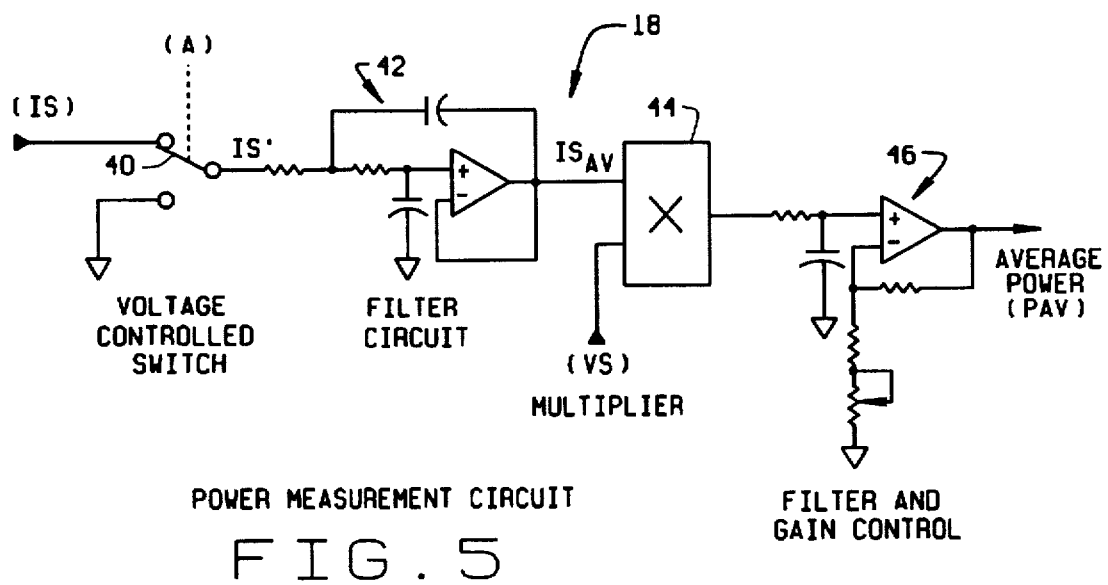
FIG. 5 is a schematic electrical circuit diagram of the power measurement circuit.
Figure 6A:
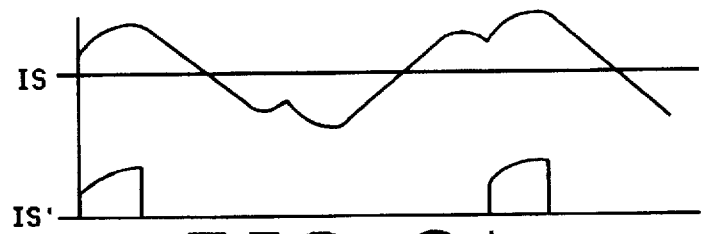
FIGS. 6A and 6B are illustrations of waveforms pertaining to the power measurement circuit per FIG. 5.
Figure 6B:
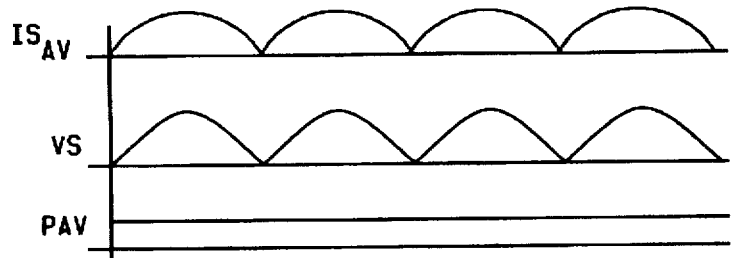

The power measurement circuit 18 is shown in FIG. 5 and the waveforms pertaining thereto are shown in FIGS. 6A and 6B. FIG. 6A shows the waveforms at the switching frequency of the inverter, while FIG. 6B shows the waveforms at the line frequency. The power measurement circuit uses a state space-averaging technique to calculate the average power.

The current sense signal IS from the impedance matching circuit 14 is chopped by means of a voltage controlled switch (VCS) 40. The switch 40 is controlled from signal A which is used also to control the state of switch Q3 of the inverter. When the signal A is in its high state and power is transferred to the load, the switch 40 is closed to the signal IS. When the signal A is in a low state, the switch 40 is closed to the signal common. The signal IS' from the switch 40 is then filtered through an averaging circuit 42 to provide a voltage signal ISav proportional to the d.c. current feeding the inverter circuit 12. The filter circuit 42 must have a bandwidth no greater than one-half the switching frequency of the inverter in order to be effective. The output signal ISav from the filter circuit 42 is then multiplied with the VS signal from the inverter. The output from the multiplier 44 is further filtered by an averaging and gain control circuit 46. The output from this circuit 46 creates a voltage signal PAV proportional to the average power supplied to the transducer or transducers.

Figure 7:
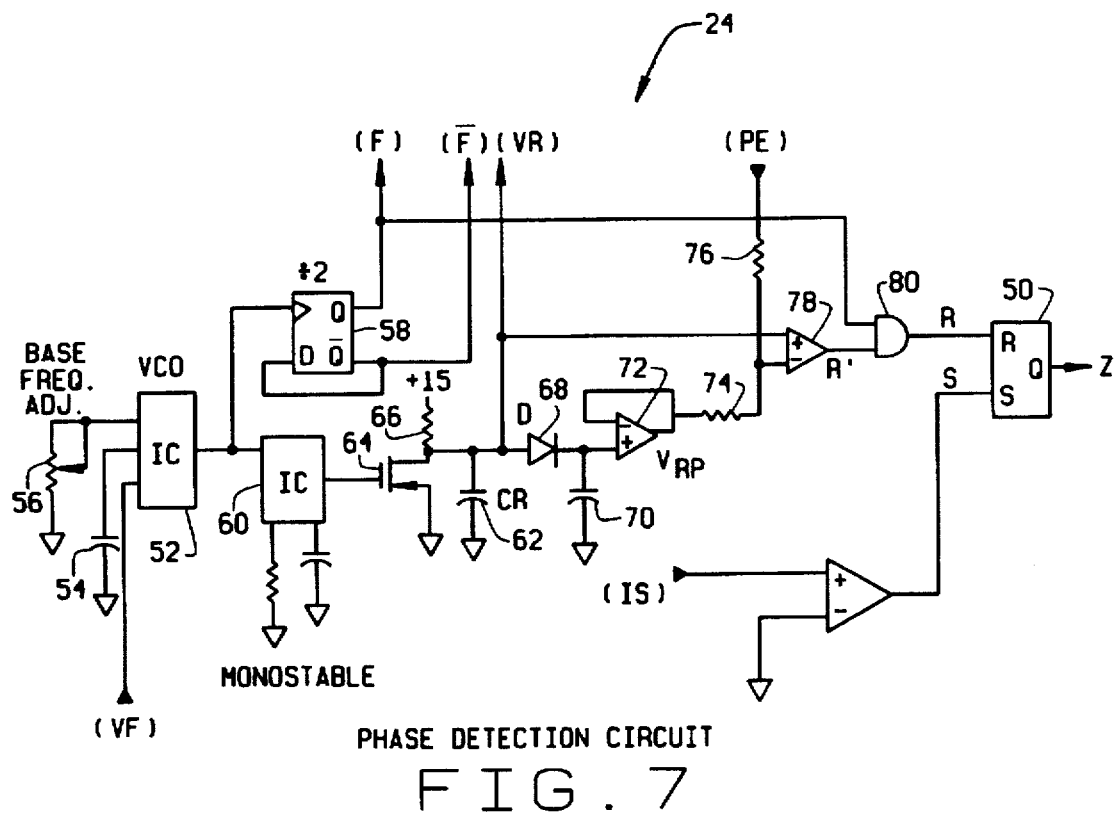
FIG. 7 is a schematic electrical circuit diagram of the phase detector circuit.
Figure 8:
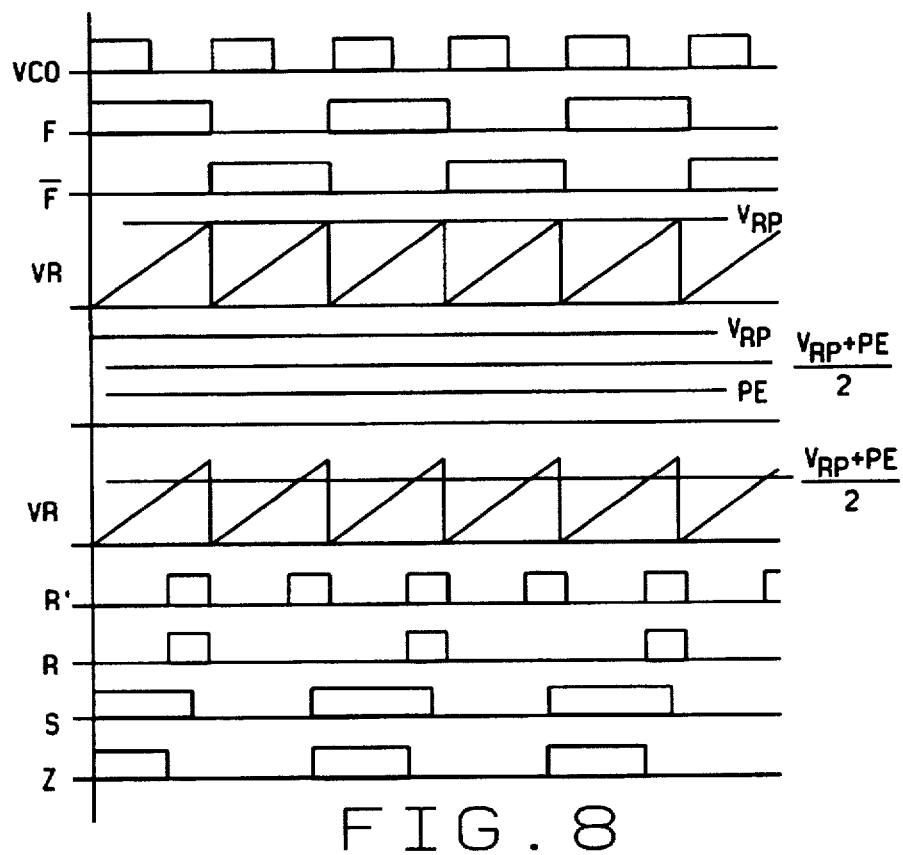
FIG. 8 is an illustration of the waveforms pertaining to FIG. 7.

The phase detection circuit 24 is shown in FIG. 7 and the waveforms relating thereto are shown in FIG. 8. This circuit is used to calculate the phase error between the output voltage and current of the inverter. When the current and voltage are in phase, the output frequency is the resonant frequency.

The phase detector is an RS flip-flop 50. The optimal setting is when the two input phase signals, the reference signal R representing the voltage phase of the inverter and the reference signal S representing the current phase of the inverter are 180 degrees apart. When in this condition, the duty cycle output of the flip-flop will be fifty per cent. The duty cycle output will increase or decrease depending on the phase difference between the two signals. This condition provides a positive slope transfer function over a 360 degree range.

The inverter current phasing signal of the phase detection circuit is derived by providing a logic level square wave in phase with the signal IS from a comparator. A rising edge of the square wave signal occurs during each positive slope zero crossing of the current and sets the flip-flop high condition. The derivation of the reset signal for the flip-flop 50 is as follows.

A voltage controlled oscillator (VCO) 52 creates a pulse train at twice the switching frequency of the inverter. A timing capacitor 54 and a variable resistor 56 are used for adjusting the base frequency of the voltage controlled oscillator 52. The pulse train from the oscillator is divided in a D flip-flop 58 to produce two square waves having half the frequency of the oscillator 52 and 180 degrees apart. These square waves F and $\bar{F}$ are used for sequencing the switching of the semiconductor switches in the inverter. The pulse train from the oscillator 52 also triggers an integrated circuit (IC) 60 used as a monostable one-shot multivibrator. When the pulse from the multivibrator 60 is in its high state, the capacitor (CR) 62 is discharged through a MOFSET semiconductor switch 64. When the multivibrator pulse is in its low state, resistor 66 charges the capacitor 62 at an exponential rate. This causes a ramp signal VR which is furnished to the power control circuit 20. If the time constant of the resistor 66 times the capacitor 62 is much greater than the period of the inverter's switching cycle, the ramp voltage VR will be nearly linear.

Diode (D) 68 and capacitor 70 act as a peak detector and capture the peak voltage Vrp of the ramp signal VR. This peak voltage is applied to a buffer amplifier 72 and added through two equally matched resistors 74 and 76 with the signal PE from the power control circuit 20. The summed signal is compared back to the VR signal via a comparator 78, hence causing a logic level square wave at twice the switching frequency of the inverter. The output signal from the comparator is combined with the F signal provided by the flip-flop 58 in an AND gate 80 for phasing with the switching sequence of the inverter and resets the RS flip-flop 50.

Figure 9:
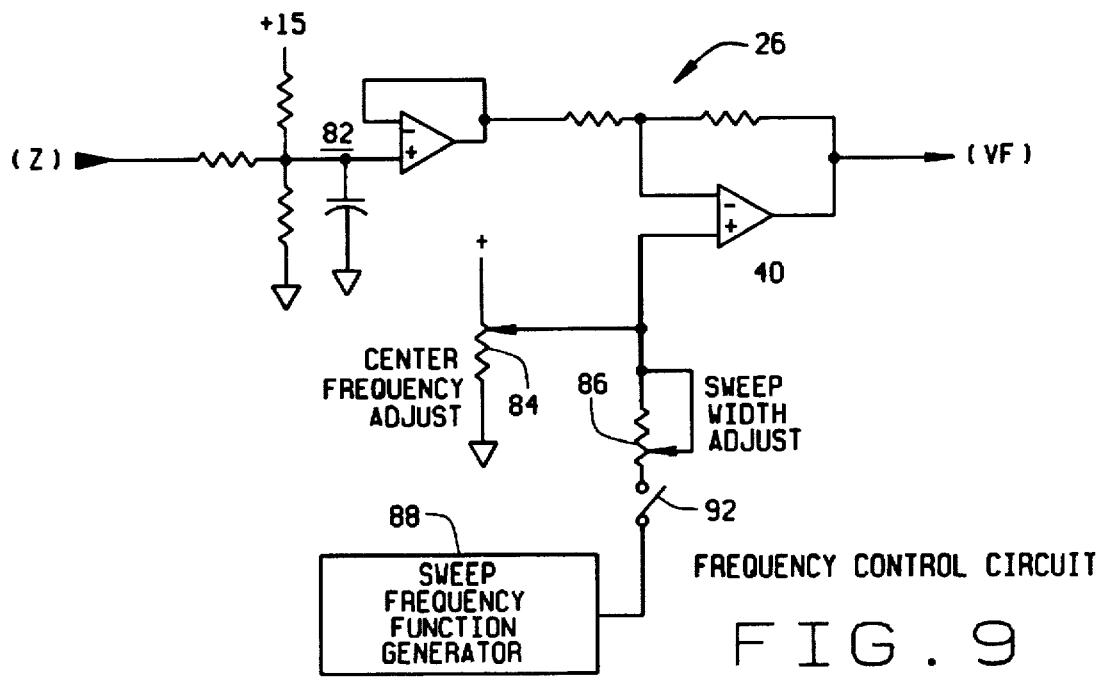
FIG. 9 is a schematic electrical circuit diagram of the frequency control circuit.

The frequency control circuit 26 is shown in FIG. 9. The output signal Z from the flip-flop 50 of the phase detection circuit 24 is averaged and buffered in a filter circuit 82. The output voltage of the filter circuit is proportional to the input duty cycle and represents the phase error. The center frequency adjustment signal from resistor 84 and the adjustable output signal from the sweep frequency function generator, numerals 86 and 88, are combined and meet the phase error signal Z at a difference amplifier 90. The difference amplifier 90 produces a signal VF which is used to drive the voltage controlled oscillator 52 of the phase detection circuit 24. A switch 92 serves to optionally provide the sweep frequency function. In a typical embodiment the sweep frequency function generator provides a triangular sweep signal from 80 to 1,000 Hz and the sweep width is adjustable from ±200 Hz to ±1,000 Hz.

Figure 10:
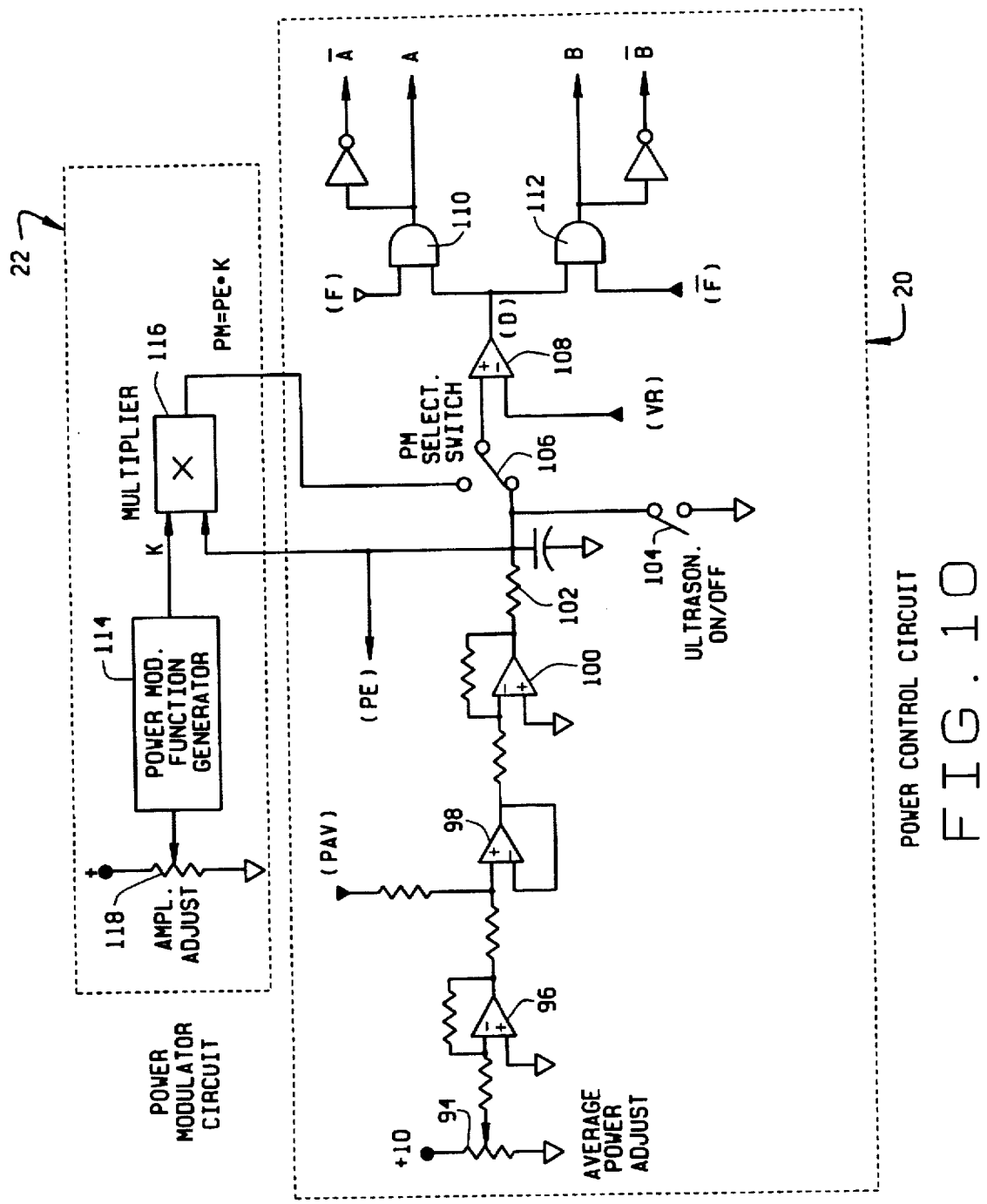
FIG. 10 is a schematic electrical circuit diagram of the power control circuit and the power modulation circuit.
Figure 11:
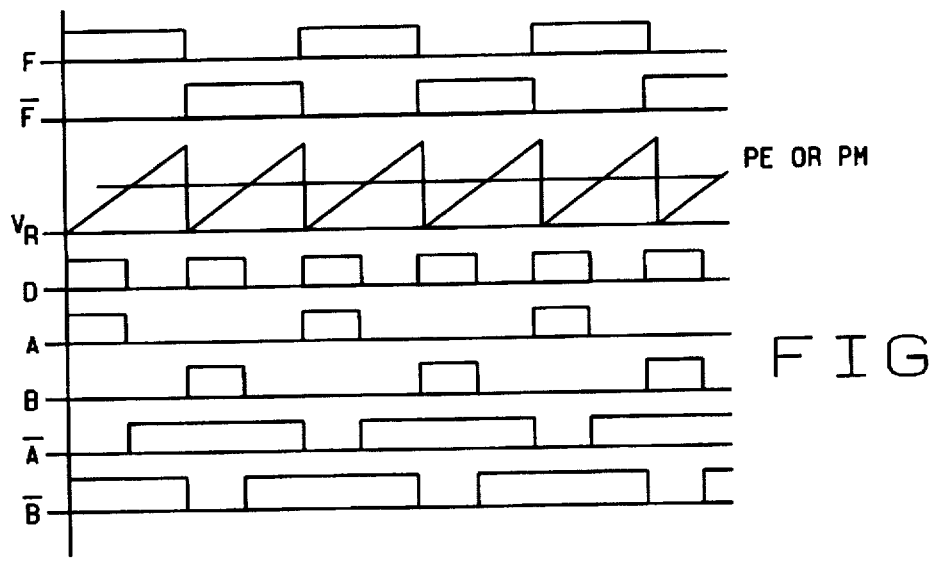
FIG. 11 shows the waveforms pertaining to the power control circuit of FIG. 10.
Figure 12:
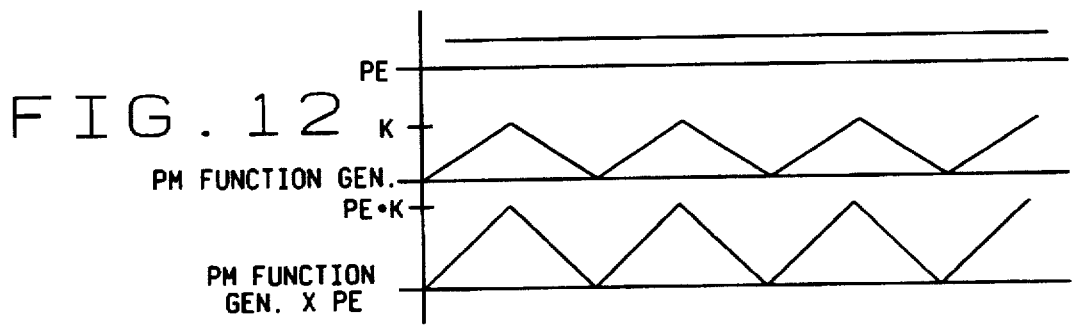
FIG. 12 shows the waveforms for the power modulation circuit of FIG. 10.

FIG. 10 shows the power control circuit and the power modulator circuit connected thereto, the waveforms being shown in FIGS. 11 and 12. The power control circuit is a negative feedback loop and produces the switching sequence and the duty cycle for the switches of the inverter and thereby controls the output power to the transducer means.

With reference to FIG. 10, a variable resistor 94 is set by the user to set the average output power. This signal is inverted by inverter 96 and summed with the average power signal PAV from the power measurement circuit 18 and the summed signal is sent to a buffer amplifier 98. The output signal from the buffer amplifier 98 represents the difference between the set average power and the actual power. This difference signal is then inverted and scaled up using an amplifier circuit 100. If the gain of the amplifier circuit is large, its output signal PE will be nearly equal to the set average power signal. An R/C filter circuit 102 with a bandwidth of one-tenth that of the power measurement circuit averages and stabilizes the PE signal. The ultrasonic energy is turned off by switch 104, which connects the capacitor of the filter circuit 102 to the signal ground. When the switch is opened, the capacitor charges exponentially, thus creating a ramp or soft start of the output power. A further switch 106 is used by the user to select whether the power supply is operated in the normal mode with signal PE or in the power modulation mode PM. The PE signal or the PM signal is compared in the comparator 108 with the ramp signal VR, which was produced in the phase detector circuit 24. The output signal D of the comparator 108 is a square wave operating at twice the frequency of the inverter and having a duty cycle proportional to the set average power. The signal D is then combined with the signals F and $\bar{F}$ in AND gates 110 and 112 to produce the appropriate phase control signals A and $\bar{A}$, B and $\bar{B}$ for the two legs of the inverter. The logic inverse of signals A and B, namely $\bar{A}$ and $\bar{B}$, control the state of the two low side electronic switches of the inverter.

The modulator circuit 22, FIGS. 10 and 12, operates by multiplying the signal PE, which is substantially equal to the average power adjustment signal from control 94 and generated in the power control circuit 20, with a waveform produced by a function generator 114 in the multiplier circuit 116. The output signal from the function generator 114 is a triangular wave with minimum amplitude and a peak amplitude set by the control 118. When the signal from the function generator 114 is multiplied with the signal PE, the resultant waveform is a periodic wave with a zero minimum and a peak proportional to the signal PE. This waveform PM, the product of the multiplier 116, is used in the power control circuit to cause, responsive to the suitable setting of switch 106, the peak or power bursts necessary for causing cavitation in certain liquids. It should be noted that the control 118 sets the power modulation for causing the output power to operate at a set peak to average power ratio.

Figure 13:
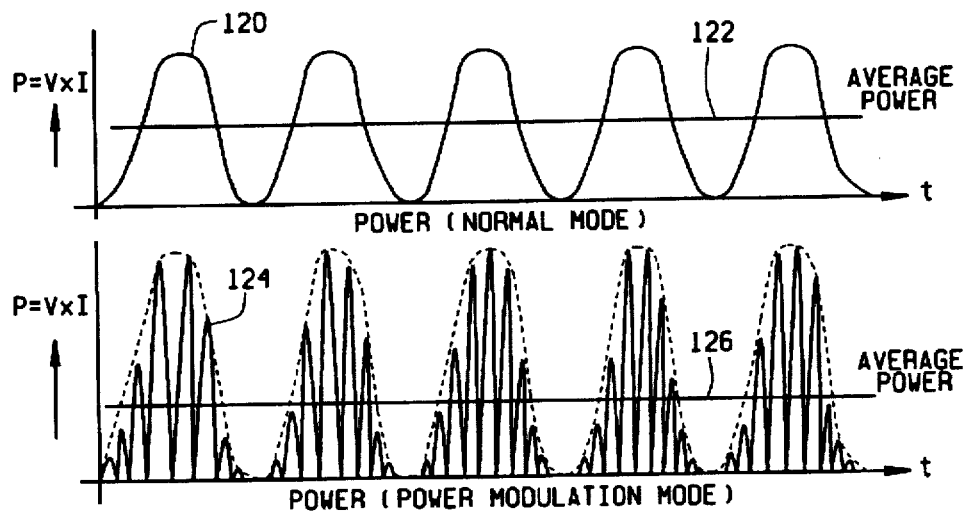
FIG. 13 shows typical power waveforms.

Referring now to FIG. 13, there are shown two power output waves for illustrating the effect of power modulation. Curve 120 represents the power wave to the transducer means in the normal operational mode and line 122 indicates the average power level. Curve 124 illustrates the periodic power bursts when using the power modulation feature and line 126 denotes again the average power. It should be observed that the average power in both instances is substantially identical.

While there has been described and illustrated a preferred embodiment of my invention, it will be apparent to those skilled in the art that certain changes and modifications can be made without affecting the broad principle of this invention, which shall be limited only by the scope of the appended claims.

I claim:

1. An ultrasonic frequency power supply for driving transducer means providing ultrasonic energy to a cleaning liquid, comprising:

means for receiving alternating current input and providing substantially unfiltered full wave rectified direct current output, the undulations of the direct current voltage output having substantially the same phase and amplitude as the voltage of said alternating current input;

inverter means coupled for receiving said direct current output and producing responsive to power control means acting upon said inverter means and series connected impedance matching means an alternating current voltage for driving said transducer means;

said power control means operating said inverter means responsive to:

(a) power measuring means and power adjustable means connected to said control means for causing said transducer means to operate at a set average power level;

(b) phase detection means and frequency control means connected to said control means for causing said transducer means to operate substantially at its resonant frequency; and (c) power modulation means connected to said control means for optionally providing to said transducer means peak power pulses of a set amplitude but at constant said set average power level.

2. An ultrasonic frequency power supply as set forth in claim 1, said phase detection means and frequency control means causing said transducer means to operate at its series resonant frequency condition.

3. An ultrasonic frequency power supply as set forth in claim 1, said frequency control means including sweep frequency generating means for causing said resonant frequency to be swept symmetrically over a set frequency range and at a set rate.

4. An ultrasonic frequency power supply as set forth in claim 1, said inverter means comprising switching means operable at a variable duty cycle responsive to input signals from said power control means for providing said alternating current voltage, whereby the amplitude of said alternating current voltage is responsive to the duty cycle of said switching means.

5. An ultrasonic frequency power supply as set forth in claim 1, said inverter means comprising a clamped mode resonant converter.

6. An ultrasonic frequency power supply as set forth in claim 1, said impedance matching means including an isolation transformer and an inductance dimensioned for providing operation of said transducer means at said resonant frequency and substantially filtering out harmonics having a frequency higher than said resonant frequency.

7. An ultrasonic frequency power supply as set forth in claim 1, said power control means including means for ramping the power driving said transducer means from an OFF condition to a set average power level.

8. An ultrasonic frequency power supply as set forth in claim 1, said power modulation means including a generator for producing triangular wave signals, control means for setting the peak of said wave signals, and a multiplier circuit for multiplying said triangular wave signals with a signal corresponding to the set average power level, thereby causing the transducer means to receive periodic power burst pulses at a set peak to average power ratio.

9. An ultrasonic frequency power supply for driving transducer means at its series resonant frequency and said transducer means adapted to provide ultrasonic energy to a cleaning liquid comprising:

rectifier means for receiving alternating current input and providing a substantially unfiltered direct current voltage having undulations whose amplitude and phrase are substantially coincident with the alternating current input voltage;

inverter means having switching means coupled for receiving said direct current voltage and producing, responsive to power control means acting upon said switching means, a direct current voltage, the value of which is commensurate with pulse width modulation effective upon said switching means by said power control means;

impedance matching means coupled in series with said inverter means for receiving said direct current voltage from said inverter means and causing filtered alternating current voltage for energizing said transducer means;

frequency control means and phase detection means coupled to said power control means for receiving a signal responsive to the phase difference between the alternating voltage and current energizing said transducer means and controlling said inverter means responsive to said phase difference signal for minimizing said phase signal indicating said resonance frequency condition;

means coupled for causing said resonant frequency to be swept symmetrically over a set frequency range and at a set rate;

further means coupled for measuring the electrical power energizing said transducer means and causing said power control means to control the pulse width modulation of said switching means to provide a substantially constant set average power;

power modulator means coupled to said power control means for optionally causing power bursts of a set peak to set average power ratio to be provided to said transducer means; and electrical circuit means coupled in circuit with said power control means for causing the power delivered to said transducer means to be ramped up from a power OFF condition to the set average power.

* * * * *